T. McDONALD.
PNEUMATIC COTTON SEED SEPARATOR AND CLEANER.
APPLICATION FILED MAR. 19, 1910.
972,212.
Patented Oct. 11, 1910.
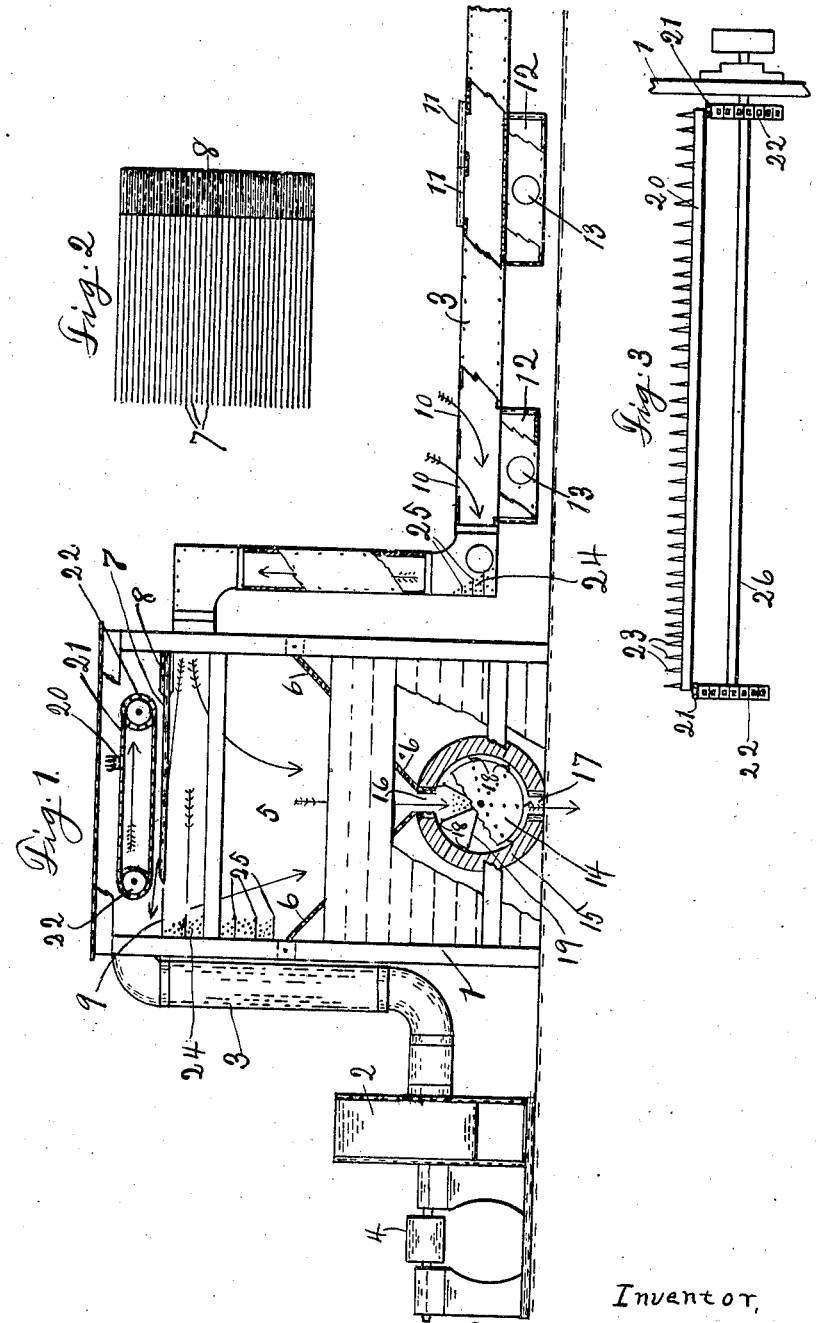
Witnesses:
W. R. Joy.
C. T. Douglass
Inventor,
Thomas McDonald,
By A. D. Jackson,
Atty.

UNITED STATES PATENT OFFICE.

THOMAS McDONALD, OF DUBLIN, TEXAS.

PNEUMATIC COTTON-SEED SEPARATOR AND CLEANER.

972,212. Specification of Letters Patent. Patented Oct. 11, 1910.

Application filed March 19, 1910. Serial No. 550,525.

*To all whom it may concern:*

Be it known that I, THOMAS MCDONALD, a citizen of the United States, residing at Dublin, in the county of Erath and State of Texas, have invented certain new and useful Improvements in Pneumatic Cotton-Seed Separators and Cleaners, of which the following is a specification.

My invention relates to cotton seed cleaners and more particularly to certain devices for separating dirt and other matter from cotton seed which are to be used in cotton oil mills, and the object is to provide a machine for separating all the dirt, dust, trash, nails, or gravel and other matter not desirable in the manufacture of cotton seed oil and meal and to devices for taking away all such trash and heavy and hard substances and clearing the same out of the machine.

Another object is to provide a machine which will not be choked up by accumulations of dirt and other matter and which will clean itself.

Another object is to provide the machine with certain devices which will prevent the crushing of the seed, while being cleaned.

Other objects and advantages will be fully explained in the following description and the invention will be more particularly pointed out in the claims.

Reference is had to the accompanying drawings which form a part of this application.

Figure 1 is a side elevation of the machine, partly in section. Fig. 2 is a plan view of the separating bars or strips. Fig. 3 is a front elevation of the cleaning rake or comb which prevents the separating bars from being choked by dirt or trash.

Similar characters of reference are used to indicate the same parts throughout the several views.

This machine is in the class of pneumatic separators. The machine is provided with a casing 1 and parts of the casing are removed in Fig. 1 to expose certain interior operating devices. The machine is provided with a fan 2 for the purpose of creating a strong draft in a pipe 3 which may be two or three hundred feet long. A pulley 4 is shown for driving the fan 2. The pipe 3 is intercepted by a cleaning and separating chamber 5, which has a hopper-shaped bottom 6. Within the chamber 5 is mounted a cleaning and separating device consisting of a series of bars or strips 7 which are inserted in a cross-bar 8. These bars or strips are horizontally disposed just above a draft which is passing through the pipe 3 and the draft is forced upwardly through the bars before it passes out of the chamber 5. A horizontally disposed divider board 9 is mounted in the chamber 5 close to the termination of the bars 7. There is no escape for the draft from the chamber 5 except up through the bars 7. The bars 7 terminate close enough to the divider board 9 to prevent seed from passing up between the bars and the divider board. The bars 7 must also be close enough together to prevent seed from passing through. The seed are fed to the pipe 3 through openings 10. There may be any number of these openings. The openings not being used should be closed by doors 11. Pockets 12 are provided for receiving gravel or stones, nails, pieces of iron, or any substance that may be in the seed. Doors 13 which are kept normally closed air tight are provided for removal of the heavy refuse which may accumulate in the pockets 12.

As the seed pass into the chamber 5, they will fall downwardly and the trash and dirt and dust will be drawn upwardly through the bars 7 and pass on through the pipe 3. The chamber 5 is provided with a rotary discharge valve 14 for discharging the seed after they have been cleaned. This valve 14 is provided with a cylindrical casing 15 which has receiving and discharging ports 16 and 17 respectively and the valve is kept air-tight by rubber flaps 18 which rub against the inner surface of the casing 15 and prevent air from passing up through the valve. The valve 14 is provided with wings 19 and the rubber flaps are carried on the outer edges of the wings 19. The seed fall down between the wings 19 and when the valve turns over the seed are discharged through the port or opening 17. Should dust or trash accumulate on the bars or strips 7, such may be cleared away by a rake or comb 20 which is made to move above the bars 7 by two sprocket chains 21 which are driven by two sprocket wheels 22 on a shaft 26 at each end of the sprocket chains. The teeth 23 of the comb or rake 20 run between the bars 7 and clear out any accumulation of dirt or trash which will be carried on through the pipe 3 and out the fan.

Means are provided for preventing the cracking of the hulls of the seed as they pass through the cleaner. At the points 24 where the seed would be driven against the walls hard enough to crack the seed hulls, shelves 25 are mounted and these project out far enough for a few seed to accumulate thereon and form cushions for the seed which are being driven through the machine. This will prevent the cracking of the hulls.

Having fully described my invention, what I claim as new and desire to secure by Letters Patent, is,—

1. A cotton seed separator and cleaner having a suction pipe and means for creating suction therethrough, a casing intercepting said pipe, and means in said casing for separating dirt and trash from the seed consisting of a series of parallel bars held rigid at one end and a divider board adjacent to the free ends of said bars.

2. A cotton seed separator and cleaner having a suction pipe and means for creating suction therethrough, a casing intercepting said pipe, means in said casing for separating dirt and trash from the seed consisting of a series of parallel bars horizontally disposed therein and held rigid at one end and free at the other end and a divider board mounted adjacent to the free ends of said bars, and a traveling comb moving through and toward the free ends of said bars.

3. A cotton seed separator and cleaner having a suction pipe and means for creating suction therethrough, a casing intercepting said pipe, means in said casing for separating dirt and trash from the seed consisting of a series of horizontally disposed parallel bars held rigid at one end and a divider board mounted adjacent to the free ends of said bars, and shelves below said divider board for gathering seed to form a cushion.

4. A cotton seed separator and cleaner having a suction pipe and means for creating suction therethrough, a casing intercepting said pipe, the outlet of said pipe from said casing being higher than the inlet thereto, a series of parallel bars horizontally disposed between the inlet and the outlet in said casing, a divider board mounted at the free ends of said bars, and means in said pipe and in said casing for preventing the breaking of the seed hulls consisting of shelves for accumulating seed to form cushions.

In testimony whereof, I set my hand in the presence of two witnesses, this 28th day of February, 1910.

THOMAS McDONALD.

Witnesses:
A. L. JACKSON,
E. B. RANDLE.